US010655747B2

(12) United States Patent
Vopel et al.

(10) Patent No.: US 10,655,747 B2
(45) Date of Patent: May 19, 2020

(54) DOUBLE-ARMATURE SOLENOID VALVE AND OPERATING METHOD

(71) Applicants: Kendrion (Markdorf) GmbH, Markdorf (DE); Mahle International GmbH, Stuttgart (DE)

(72) Inventors: David Vopel, Ravensburg (DE); Marco Kiene, Aachlinz (DE); Frank Zelano, St. Georgen (DE); Joachim Fluehs, Vs-Villingen (DE); Bjoern Bergfeld, Balingen (DE); Michael Braunheim, Goeppingen (DE); Matthias Gaenswein, Esslingen (DE); Werner Schadler, Leibnitz (AT)

(73) Assignees: Kendrion (Markdorf) GmbH (DE); Mahle International GmbH (DE)

(*) Notice: Subject to any disclaimer, the term of this patent is extended or adjusted under 35 U.S.C. 154(b) by 0 days.

(21) Appl. No.: 16/309,922

(22) PCT Filed: May 8, 2017

(86) PCT No.: PCT/EP2017/060926
§ 371 (c)(1),
(2) Date: Dec. 13, 2018

(87) PCT Pub. No.: WO2017/215842
PCT Pub. Date: Dec. 21, 2017

(65) Prior Publication Data
US 2019/0145541 A1 May 16, 2019

(30) Foreign Application Priority Data
Jun. 14, 2016 (DE) .................. 10 2016 110 899

(51) Int. Cl.
*F16K 31/06* (2006.01)
*F02M 37/28* (2019.01)

(52) U.S. Cl.
CPC ...... *F16K 31/0658* (2013.01); *F16K 31/0606* (2013.01); *F02M 37/28* (2019.01)

(58) Field of Classification Search
CPC .. F16K 31/0606; F16K 31/0658; F02M 37/28
See application file for complete search history.

(56) References Cited

U.S. PATENT DOCUMENTS 3,842,860 A * 10/1974 Stampfli ............. F16K 31/0606
137/596.17
4,778,227 A    10/1988 Bayliss
(Continued)

FOREIGN PATENT DOCUMENTS

DE   102007005916 A1   8/2008
DE   102010054704 A1   6/2012

OTHER PUBLICATIONS

English abstract for DE-102007005916.

*Primary Examiner* — Eric Keasel
(74) *Attorney, Agent, or Firm* — Fishman Stewart PLLC

(57) ABSTRACT

A double-armature solenoid valve may include an adjustable first armature and an adjustable second armature arranged axially opposite each other along a common adjustment axis, and a coil mechanism configured to provide a magnetic flux. The valve may also include a first restoring spring, a second restoring spring, an inlet opening arranged on an axial side of the first armature opposite the second armature, and an outlet opening arranged on an axial side of the second armature opposite the first armature. The inlet opening and the outlet opening may be connected via a fluid duct. The first armature and the second armature may respectively have a different closing time such that when an energization of the coil mechanism is at least one of interrupted and (Continued)

reduced the inlet opening is closable more quickly via the first armature than the outlet opening via the second armature.

20 Claims, 2 Drawing Sheets

(56) References Cited

U.S. PATENT DOCUMENTS

| | | | | |
|---|---|---|---|---|
| 6,026,860 A * | 2/2000 | Teichmann | ............ | F16K 31/06 137/870 |
| 8,794,718 B2 * | 8/2014 | Bensch | .................. | B60T 8/362 137/596.1 |
| 2013/0320639 A1 | 12/2013 | Frank et al. | | |

* cited by examiner

DOUBLE-ARMATURE SOLENOID VALVE AND OPERATING METHOD

CROSS-REFERENCE TO RELATED APPLICATIONS

This application claims priority to International Patent Application No. PCT/EP2017/060926 filed May 8, 2017, and German Patent Application No. DE 10 2016 110 899.5, filed Jun. 14, 2016, the contents of both of which are hereby incorporated by reference in their entirety.

TECHNICAL FIELD

The invention relates to a double-armature solenoid valve, in particular for discharging water from fuel systems in motor vehicles, in particular from diesel fuel systems, having a first armature and a second armature, which lie axially opposite each other along a common adjustment axis (at the end side), i.e. formed from two axially adjacent, preferably axially aligned, armature adjustment axes or partial armature adjustment axes, and can be axially adjusted toward each other into a respective open position and away from each other into a respective closed position, and having, preferably arranged on the periphery of the two armatures, coil means, in particular common coil means which are more preferably formed by a common coil or winding, which have the purpose of producing a magnetic flux in both armatures in order to move the armatures toward each other along the adjustment axis, i.e. into the respective open position (for opening an inlet opening and an outlet opening of the valve) given corresponding energization of the coil means, as well as having at least one first restoring spring which applies spring force to the first armature axially away from the second armature, i.e. in the direction of its closed position, and at least one second restoring spring which applies spring force to the second armature axially away from the first armature, i.e. in the direction of its closed position, wherein an, in particular elastomer, first sealing element which is preferably arranged on the first armature and has the purpose of sealing an inlet opening, arranged on the axial side of the first armature facing away from the second armature, for pressurized fluid, in particular for the abovementioned water, from a motor vehicle fuel system, is assigned to the first armature, and wherein a, preferably elastomer, second sealing element which is preferably arranged on the second armature and has the purpose of sealing an outlet opening, arranged on the axial side of the second armature facing away from the first armature, for the fluid, in particular a liquid, is assigned to the second armature, wherein the inlet opening and the outlet opening are connected in a fluid-conducting fashion via a fluid duct which is preferably formed by an armature space which accommodates the armatures and is particularly preferably bounded radially on the outside by an axially extending armature guiding tube. The abovementioned sealing elements are preferably secured to the respective armature and can be axially adjusted together therewith. In an alternative embodiment, the sealing elements can also be provided in a positionally fixed fashion in the region of the respective valve seat.

In addition, the invention relates to a method for operating such a double-armature solenoid valve, wherein the, in particular common, coil means are energized and as a result the armatures are adjusted axially toward one another along the adjustment axis in order to open the inlet opening and the outlet opening (counter to the respective spring force of the assigned restoring spring), as a result of which fluid, preferably a liquid, in particular water from a motor vehicle fuel system, preferably from a motor vehicle diesel fuel system, flows into the connecting duct through the inlet opening and through said connecting duct to the outlet opening and through the latter, and in that in order to close the inlet opening and the outlet opening the energization of the coil means is reduced or interrupted, as a result of which the first armature is moved into its closed position in the direction of the inlet opening by the first restoring spring, and the second armature is moved into its closed position in the direction of the outlet opening by the second restoring spring.

In addition, the invention gives rise to a fuel system, in particular a diesel fuel system in a motor vehicle having a double-armature solenoid valve, with which water (precipitated from the fuel) can be drained from the fuel system, for example into a corresponding tank or in the direction of the underlying surface.

BACKGROUND

In the case of diesel fuel, in particular in newly industrializing countries and developing countries there is the problem that said fuel contains a large proportion of water, partially owing to intentional admixture, partially owing to poor production and/or storage conditions and technologies. So that the water contained in the diesel fuel does not enter the internal combustion engine, a wide variety of different technologies have become known for precipitating the water out of the diesel fuel. The precipitated water is discharged manually or in an automated fashion depending on the vehicle technology. Double-armature solenoid valves as described, for example, in DE 10 2007 005 916 A1, have become known for the automated discharging of water which is usually under pressure in a water accumulator of the motor vehicle fuel system. The known double-armature solenoid valves have proven themselves, but efforts are being made, in particular with respect to corresponding environmental requirements, to improve further the safety of such double-armature solenoid valves in order to reliably avoid unintentional discharging of fuel, in particular of diesel fuel, into the environment.

In the double solenoid valve which is known from DE 10 2007 005 916 A1, two armatures are arranged with their end sides axially opposite each other along a common adjustment axis and are moved toward one another into a central or respective opening position by energizing a common coil. As a result, an inlet opening, through pressurized water flows, is opened into the armature space, which pressurized water exits the armature space again via the outlet opening. In order to close the two openings, the energization of the coil is interrupted and the two armatures are moved into the respective closed position, i.e. in the direction of the respective opening (inlet opening or outlet opening) by a common restoring spring which is supported with its two axial ends on one of the armatures in each case. According to the teaching of the document, instead of a common compression spring, separate restoring springs which are each embodied as a tension spring can be used. In the known double-armature solenoid valve, after the interruption of the energization of the coil the armatures are moved uniformly into the respective closed position, with the result that the inlet opening and the outlet opening are closed simultaneously.

U.S. Pat. No. 4,778,227, which is from a different specialist field, discloses a double-armature magnet of a brake system. The double-armature solenoid valve comprises two flat armatures which are arranged axially adjacent to coil means and spring force is applied to them axially away from each other, with in each case one spring in the direction of a respective closed position. The spring which applies spring force to the flat armature which is assigned to an inlet opening is configured to be weaker here than the spring which applies spring force to the other flat armature which is assigned to the outlet opening, so that when the energization of the coil means is interrupted the inlet opening is closed more slowly than the outlet opening.

SUMMARY

Taking the abovementioned prior art as a starting point, the invention is based on the object of specifying an improved double-armature solenoid valve and a method for operating such a valve, with which double-armature solenoid valve and method the reliability of preventing unintended outputting of a liquid, in particular a fuel, through the outlet opening into the environment is enhanced.

This object is achieved by the subject matter of the independent claim(s). With respect to the double-armature solenoid valve, i.e. in the case of a double-armature solenoid valve of the generic type, by virtue of the fact that means for implementing different closing times for closing the inlet opening and the outlet opening are assigned to the first and/or second armature in such a way that after the energization of the coil means has been interrupted or reduced the inlet opening can be closed or is closed, in particular can be closed or is closed at least 25 ms, preferably at least 50 ms, more quickly by means of the first armature than the outlet opening by means of the second armature, and in that an inlet opening cross-sectional area which has an effective adjustment force with respect to the first armature is smaller, preferably at least 25%, even more preferably at least 33% smaller, than an outlet opening cross-sectional area which has an adjustment force which is effective with respect to the second armature.

With respect to the (operating) method, i.e. in the case of a method of the generic type by virtue of the fact that after the interruption or reduction of the energization of the coil means, the second armature reaches its closed position for closing the outlet opening more slowly or later, in particular at least 25 ms more quickly, even more preferably at least 50 ms later than the first armature reaches its closed position for closing the inlet opening, and the fluid pressure in the connecting duct, i.e. in a region axially between the inlet opening and the outlet opening is decreased to a pressure level which is, in particular at least 25%, preferably at least 40%, lower than a fluid pressure in the direction of flow of a fluid upstream of the inlet opening (when the inlet opening is closed).

Advantageous developments of the invention are specified in the dependent claims. All combinations of at least two features which are disclosed in the description, the claims and/or the figures are covered by the scope of the invention.

In order to avoid repetitions, features which are disclosed with respect to the device will also apply as being disclosed and be capable of being claimed with respect to the method. Likewise, features which are disclosed with respect to the method are also to apply as being disclosed and be capable of being claimed with respect to the device.

In order to ensure the desired increased level of reliability of preventing a leak of the double-armature solenoid valve and of therefore reducing the risk of fuel being output into the environment to a minimum, the invention proposes a plurality of measures.

A core concept of the invention is to assign restoring springs which are separate from one another to the armatures which are arranged axially between the inlet opening and the outlet opening, which restoring springs are preferably both embodied as compression springs which therefore preferably apply force to the respective armature in the direction of its closed position or the opening which is assigned to the respective armature (inlet opening and respectively outlet opening), in order, in the event of a break in a spring or jamming of one of the two restoring springs, nevertheless to ensure reliable closing of one of the openings, with the result that a considerable escape of liquid through the outlet opening is prevented in all cases.

A further essential measure for increasing the reliability of the double-armature solenoid valve according to the invention is to implement different times by closing the inlet opening and the outlet opening. Corresponding means are provided for this purpose and/or assigned to the first and/or the second armature, with which means it is ensured that after the interruption or reduction of the energization of the coil means the first armature reaches its closed position before the second armature, i.e. before the second armature reaches its closed position, in order to close the outlet opening which is assigned to it. This ensures that there is sufficient time for a decrease in fluid pressure in the connecting duct, i.e. between the inlet opening and the outlet opening, in particular in the armature space for the armatures, since liquid can also still flow away via the outlet opening after the closing of the inlet opening by means of the second armature. This in turn leads to a situation in which after the (later) closing of the outlet opening the fluid pressure in the connecting duct is lower than the fluid pressure on the high pressure side of the valve, i.e. in a region before the inlet opening in the direction of flow. If in a case of a fault liquid continues to flow under high pressure into the connecting duct via a leak at the inlet opening which is assigned to the high-pressure side or first armature, a closing force which is induced by the fluid pressure and acts on the second armature is increased and the outlet-side armature (second armature) reliably keeps the outlet opening closed. In this context, the coil means is preferably configured or matched to the pressure surface ratio at the second armature, in such a way that the magnetic force which can be generated by the energization of the coil means, which is provided to adjust the armatures toward one another, is not sufficient to open the second armature in the case of a fault, i.e. when there is a leak at the inlet opening, counter to the fluid pressure (closing pressure) of the fluid which is present in the connecting duct at the second armature and corresponds to the fluid pressure before the inlet opening in the direction of flow, or the closing force resulting from said fluid pressure.

A further measure for increasing the operational reliability of the double-armature solenoid valve according to the invention is to give the valve seat cross-sectional areas of the inlet opening and of the outlet opening, that is to say the opening cross-sectional areas which are effective in terms of fluid pressure force and therefore adjustment force on the armatures, of the inlet opening and of the outlet opening or of the associated valve seats, different sizes, specifically in such a way that the outlet opening cross-sectional area which is effective in terms of adjustment force give larger dimensions than the inlet opening cross-sectional area which is effective in terms of adjustment force, in order thereby to optimize and/or increase the opening and closing forces which act on the armatures and are caused by fluid pressure force. In particular, as a result of this measure, a higher fluid-pressure-induced closing force is applied to the outlet-side second armature in the connecting duct which is preferably bounded radially on the outside by an armature guiding tube, with the result that said second armature reliably bears against its valve seat and the outlet opening remains closed, in particular when there is an increase in pressure in the connecting duct in the case of a previously explained, inlet-opening-side leak. At the same time, the fluidic opening force which acts on the first armature is reduced owing to the inlet opening cross-sectional area which is smaller compared to the outlet opening cross-sectional area.

One possible way of configuring the means to achieve different closing times is to dimension and/or prestress differently the different restoring springs which are assigned to the two armatures, in such a way that the first restoring spring applies a larger spring force to the first armature in its closed position and/or its open position than the second restoring spring applies to the second armature in its corresponding closed position or open position. In other words, the spring force which the first restoring spring applies to the first armature is greater than the spring force which the second restoring spring applies to the second armature. For this purpose, a spring with a higher spring constant than the second restoring spring can be used as the first restoring spring, and/or the first restoring spring can be arranged prestressed with a larger prestressing force. The spring forces preferably differ in the respective closed position and/or open position by at least 25%, even more preferably by at least 40%.

Basically, it is conceivable for the first and/or the second restoring springs to be embodied as a tension spring— preferred is an alternative embodiment with at least one compression spring, preferably two compression springs. For this preferred case, the first and the second (compression) restoring springs are each supported directly axially on the associated first or second armature and quite particularly preferably each axially with the ends, facing each other, on a common abutment element, arranged in a region between the armatures and having a through-flow opening for liquid.

In order to achieve different closing times it is additionally or alternatively possible, for the purpose of implementing different spring forces, to configure the first and the second armature differently geometrically, in particular with respect to the achieving of different magnetic flux conduction properties, for example by generating in certain sections in the first armature an increased magnetic resistance by means of a corresponding material reduction in an axial section, as will be explained later. Additionally or alternatively, it is possible to configure the first and the second armatures from materials which conduct magnetic flux differently from one another, in particular in such a way that the first armature is constructed from a material which conducts magnetic flux better than the second armature. Additionally or alternatively it is preferred that the two armatures are constructed from materials which are different from one another and have different magnetic remanences, in particular in such a way that the magnetic remanence of the armature material of the second armature is greater than that of the first armature material. Additionally or alternatively, it is in turn possible to configure the first armature with a lower mass than the second armature in order thereby to achieve or promote a more rapid movement or a more dynamic behavior of the first armature.

As is already apparent from the statements above, it is possible, with respect to the configuration of the means in order to implement different closing times and preferably, additionally or alternatively in order to implement different restoring spring configurations or prestresses and/or different armature masses, to configure the means to be magnetically effective in such a way that the adjustment movement of the second armature for achieving a later closing time is delayed and/or slowed down compared with the first armature or the adjustment movement thereof.

The means are quite particularly preferably embodied here in such a way that the magnetic remanence in the second armature is greater than in the first armature, and the second armature therefore has a greater residual magnetization or the magnetic field in the second armature decreases more slowly than in the first armature. Additionally or alternatively, the magnetic flux resistance in the first armature can be configured to be greater than in the second armature, in particular through a geometrically different configuration, in particular by providing a radial constriction section in the first armature for reducing the axial magnetic flux conductance cross section of the first armature.

One embodiment of the double-armature solenoid valve in which the first armature forms a component of the magnetic flux circuit for the second armature by the first armature implementing an (axially adjustable) core for the second armature, in the direction of which magnetic force is applied to the second armature when the coil means are energized, is quite particularly preferred. Likewise preferred is the case in which the second armature forms a component of the magnetic flux circuit of the first armature by the second armature forming an (axially adjustable) core for the first armature, in the direction of which magnetic force is applied to the first armature when the coil means are energized. Therefore when the coil means which are preferably common and comprise, in particular, a single coil, are energized, the first and the second armatures are attracted to each other and move toward each other. It is therefore possible to advantageously dispense with the magnetic cores in the magnetic flux circuit which are separate from the armatures.

It is particularly advantageously preferred, in particular with respect to the robustness, length of service life and precise switching or precise closing behavior of the inlet and outlet openings, to construct the first and second armatures not as a flat armature but rather in each case as a bolt-shaped or tappet-shaped armature which has a greater extent in the adjustment direction than perpendicularly with respect thereto, that is to say than in the radial direction.

It is quite particularly preferred if the two armatures which are accommodated in the armature space are arranged in a region radially inside the coil means, that is to say are surrounded radially on the outside by an electrical coil winding, as a result of which a particularly robust system with a long service life is obtained in particular in the case of a configuration of the armatures in the form of a tappet. The overall axial length is furthermore minimized.

The invention also gives rise to a method for operating a double-armature solenoid valve which is embodied as above. Within the scope of the method, the energization of the coil means is interrupted or reduced, with the result that the two armatures are adjusted in the direction of the respective closed position, i.e. in the direction of the respective opening, by the respective restoring spring which is preferably respectively configured as a compression spring, that is to say the first armature is adjusted against the inlet opening or the inlet opening valve seat, and the second armature is adjusted against the outlet opening or the outlet opening valve seat, wherein (as a result of the provision of corresponding means which were explained above within the scope of the double-armature solenoid valve), the first armature reaches its closed position for the sealed closing of the inlet opening more quickly than the second armature reaches its closed position for closing the outlet opening, as a result of which after the closing of the inlet opening up to the (delayed) closing of the outlet opening, fluid can flow out of the connecting duct through the outlet opening and therefore the fluid pressure in the connecting duct is reduced.

If a leak occurs in the region of the inlet opening within the scope of the operating method, fluid, in particular water, which has been precipitated out of a fuel, preferably a diesel fuel, flows into the connecting duct within the scope of the method, as a result of which fluid pressure force is applied (more strongly) to the second armature in the direction of its closed position—this fluid pressure force is then greater than a fluid-pressure-induced opening force which acts on the armature, under certain circumstances in the opposing direction, said opening force resulting from a liquid which is, under certain circumstances, located in a discharge line which is arranged after the outlet opening in the direction of flow. The fluid-pressure-induced closing force which results from the fluid-pressure-induced opening force and the fluid-pressure-induced closing force is preferably smaller here, through corresponding configuration of the coil means, than the magnetic opening force which can be generated by the coil means, with the result that in the abovementioned case of a fault involving a leak in the region of the inlet opening the second armature can no longer be adjusted in the direction of its opening position by the application of magnetic force, and therefore the double-armature solenoid valve remains reliably closed and/or is locked or remains locked by the fluid pressure.

According to one particularly preferred refinement of the method for operating a double-armature solenoid valve according to the invention there is provision that in particular as a result of a correspondingly geometric configuration of the armatures, in particular of the first armature, the magnetic flux goes more quickly into saturation in the first armature than in the second armature as a result of the provision of a corresponding magnetic resistance. Additionally or alternatively there is provision that, after the interruption or reduction of the energization of the coil means, the magnetic flux density in the second armature decreases more slowly than in the first armature, in particular as a result of a corresponding material selection of the armatures. For this purpose, the second armature is preferably configured from a material with a higher magnetic remanence than the material of the first armature.

The invention also gives rise to a fuel system, in particular to a diesel fuel system, in a motor vehicle having a double-armature solenoid valve according to the invention, which is arranged in the fuel system in such a way that water can be discharged from the fuel system with said double-armature solenoid valve through corresponding actuation of the control means assigned to the coil means, which water can be discharged, in particular, into a water tank which is provided on the motor vehicle and which then forms a component of the system according to the invention. Alternatively, owing to the inventive configuration of the double-armature solenoid valve, which configuration reliably prevents a discharging of fuel, it is also possible to output the water directly, in particular after it passes through a filter, to the surroundings. Given a corresponding embodiment of the fuel system it is also possible to conduct the water to optional evaporation means of the fuel system in order to evaporate the water. The evaporation means are preferably a component of the exhaust gas train, in particular such that the water from the double-armature solenoid valve is or can be fed to the exhaust gas train for evaporation within the scope of the system.

BRIEF DESCRIPTION OF THE DRAWINGS

Further features, advantages and details of the invention are apparent from the following description of preferred exemplary embodiments according to the invention and with reference to the drawings, in which.

DETAILED DESCRIPTION

Identical elements and elements with the same function are characterized by the same reference symbols in the figures.

Figure 1:
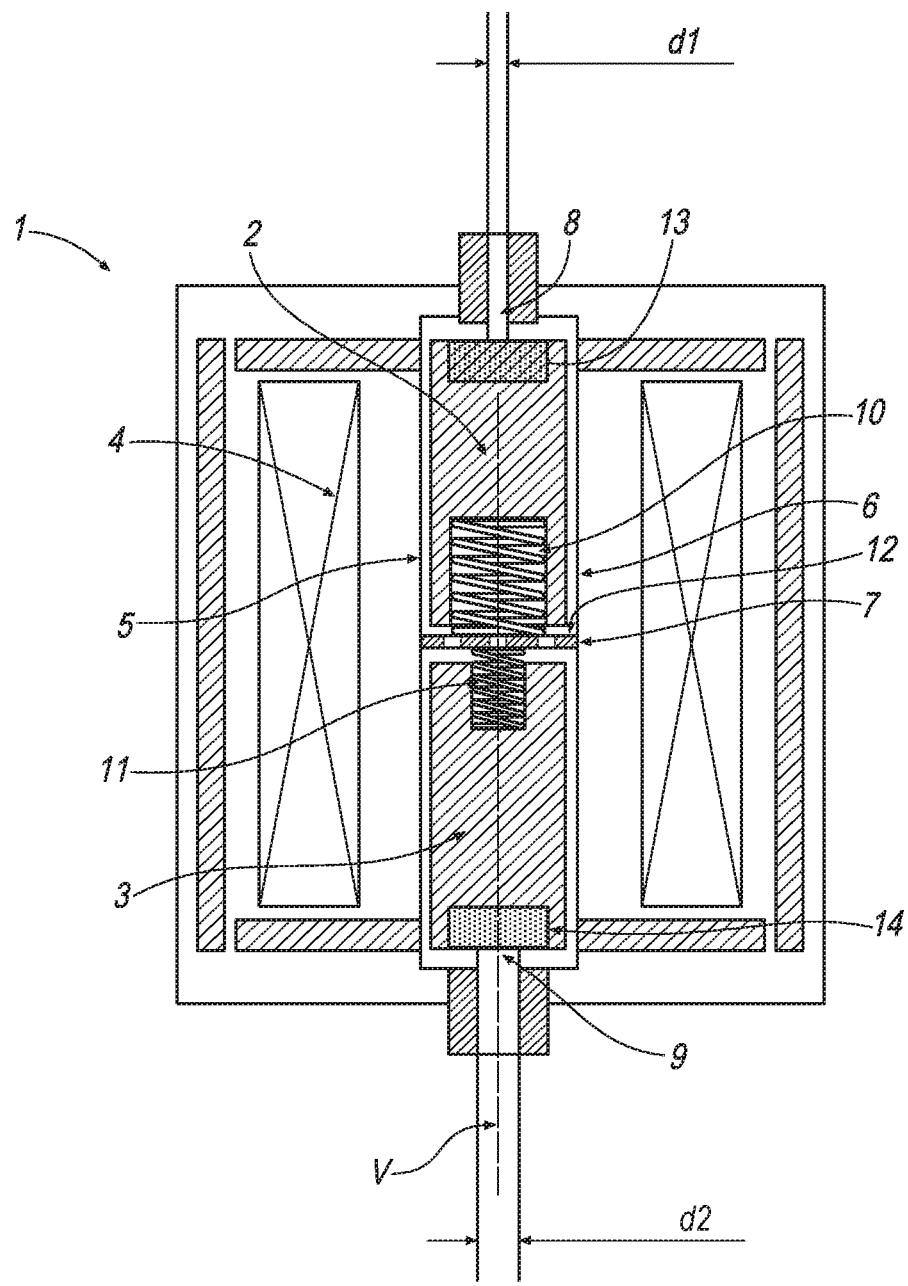
FIG. 1 shows a first inventive exemplary embodiment of a double-armature solenoid valve with two restoring springs which are differently dimensioned and/or prestressed in relation to the respectively applied spring closing force, as well as different opening cross sections.

FIG. 1 shows a first exemplary embodiment of a double-armature solenoid valve 1 according to the invention. The latter comprises a first armature 2 and a second armature 3 which are arranged opposite each other at the end sides along a common adjustment axis V. The two armatures 2, 3 are assigned common coil means 4 in the form of a common coil (electrical winding) which extends around the outer periphery of the two armatures 2, 3.

The two armatures 2, 3 are arranged in an armature space 5 which is bounded radially on the outside by an armature tube 6. The armature space 5 forms at the same time a fluidic connecting duct 7 between an inlet opening 8 and an outlet opening 9 of the double-armature solenoid valve 1. In this context, the inlet opening 8 is assigned to the first armature 2, i.e. can be closed by the latter in its closed position, and the outlet opening 9 is assigned to the second armature 3. The armature space 5 is arranged radially within the coil means 4, and as a result the two tappet-shaped armatures 2, 3 are located radially inside the coil means 4, that is to say are surrounded or enclosed by them and/or their coil winding.

Spring force is applied to the first armature 2 axially away from the second armature 3 in the direction of the inlet opening 8 by means of a first restoring spring 10, and to the second armature 3 in the direction of the outlet opening 9 by means of a second restoring spring 11. Both restoring springs 10, 11 are embodied as compression springs and are each supported at one end on the associated armature 2, 3 and at the other end on the common abutment 12 which is located axially in a region between the two armatures 2, 3.

When the common coil means 4 are energized, the armatures 2, 3 attempt to minimize the axial airgap (distance) between the armatures 2, 3, with the result that the armatures 2, 3 are moved toward one another along the adjustment axis V, specifically counter to the spring force of the respective restoring spring 10, 11. After the energization of the coil means 4 has been interrupted or reduced, the armatures 2, 3 are adjusted away from one another by means of the restoring springs 10, 11 to the respective opening (first armature 2 to the inlet opening 8, second armature 3 to the outlet opening 9).

FIG. 1 shows a different dimensioning of the restoring springs 10, 11. The restoring springs 10, 11 are embodied and arranged differently such that a larger closing force or spring force acts on the first armature 2 than on the second armature 3.

Furthermore, it is apparent that the cross-sectional faces of the inlet opening 8 and of the outlet opening 9 which are effective in terms of adjustment force, i.e. of the respectively associated valve seats are different from one another; the cross-sectional area of the inlet opening 8 is clearly smaller than that of the outlet opening 9 here. This is apparent in FIG. 1 from the differently selected diameters $d_1$, $d_2$, the diameter $d_1$ being the diameter of the inlet-opening-side valve seat of the first armature 2, and the diameter $d_2$ being the diameter of the outlet-opening-side valve seat for the second armature 3.

In the specific exemplary embodiment, each of the armatures 2, 3 has an end-side elastomer sealing element 13 or 14, wherein the sealing elements 13, 14 can alternatively also be arranged at the corresponding opening or at the corresponding valve seat, i.e. not with a variable position as illustrated here but rather in a positionally fixed fashion.

As a result of the differently configured or dimensioned and/or prestressed restoring springs, a larger closing force acts on the first armature 2, as a result of which said armature 2 moves more quickly in the direction of its inlet opening 8 than the second armature 3 moves in the direction of its outlet opening 9, and this results in different closing times. The inlet opening 8 is closed before the outlet opening 9, with the result that the pressure in the connecting duct 7 is still significantly reduced after the closing of the inlet opening 8. The different cross-sectional areas, which are effective in terms of adjustment force, of the valve seats or openings 8, 9 cause a larger fluid-pressure-induced closing force to act on the second armature 3.

Figure 2:
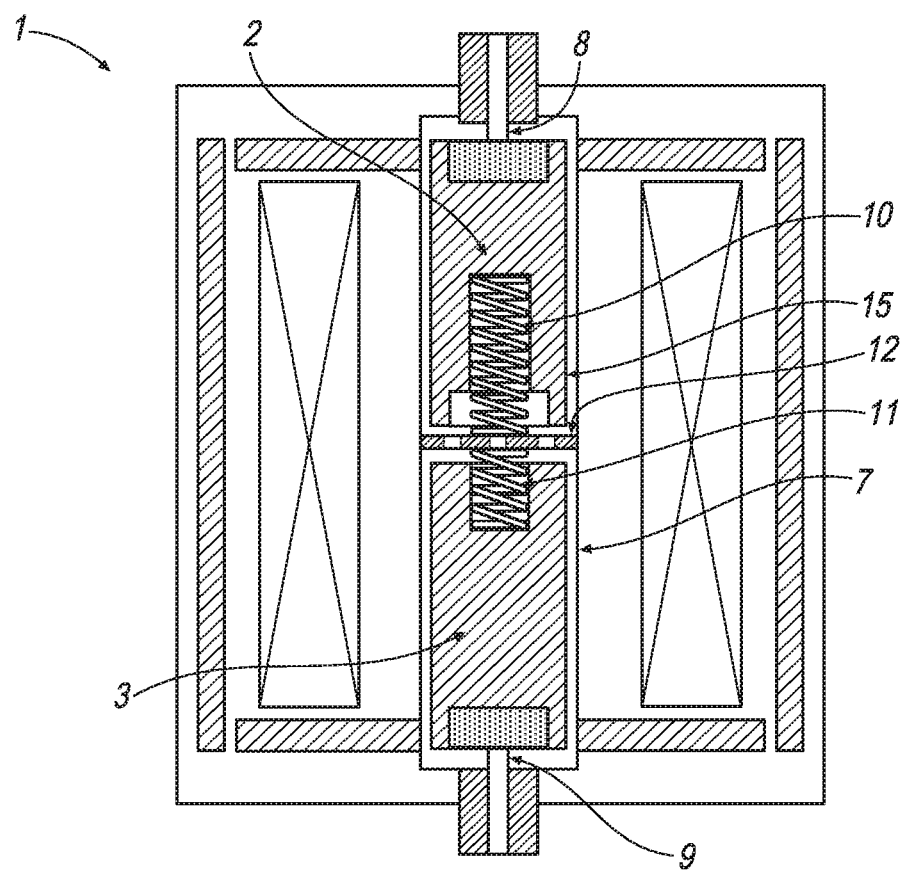
FIG. 2 shows an alternative exemplary embodiment of an inventive double-armature solenoid valve with means which are embodied magnetically in addition to different opening cross sections and have the purpose of achieving different closing times of the openings.

In the text which follows, the exemplary embodiment according FIG. 2 is explained, wherein in order to avoid repetitions details are essentially given only on differences from the exemplary embodiment according to FIG. 1. For the commonalities, reference is made to the above description of the figures and FIG. 1.

In the exemplary embodiment according to FIG. 2, the radial cross section or the cross-sectional area, which is effective in terms of magnetic flux, of the first armature 2 is reduced in an axial section 15, here by way of example and preferably in an end-side axial section 15 facing the second armature 3, with the result that more rapid magnetic saturation occurs in the first armature 2 owing to an increased magnetic resistance. Additionally or alternatively, the second armature 3 can be constructed from a material with a higher magnetic remanence and/or a lower mass density.

As in the exemplary embodiment according to FIG. 1, the cross-sectional areas of the inlet opening 8 and of the outlet opening 9 are different. Where necessary, differently dimensioned restoring springs 10, 11 and/or restoring springs 10, 11 having a different spring constant can also be used and/or the restoring springs 10, 11 can be prestressed to differing degrees.

The effect achieved with the exemplary embodiment according to FIG. 2 corresponds to that of the first exemplary embodiment—the first armature 2 closes the inlet opening 8 more quickly than the second armature 3 closes the outlet opening 9, after the energization of the coil means has been interrupted or correspondingly reduced, which brings about a desired decrease in pressure in the connecting duct 7.

The invention claimed is:

1. A double-armature solenoid valve, comprising:
a first armature and a second armature arranged axially opposite each other along a common adjustment axis, the first armature and the second armature axially adjustable toward each other into a respective open position and away from each other into a respective closed position;
a coil mechanism configured to provide a magnetic flux in both the first armature and the second armature such that the first armature and the second armature are adjustable toward each other along the adjustment axis;
at least one first restoring spring applying a first spring force to the first armature axially away from the second armature;
at least one second restoring spring applying a second spring force to the second armature axially away from the first armature;
a first sealing element corresponding to the first armature and selectively sealing an inlet opening configured to communicate a pressurized fluid from a motor vehicle fuel system, the inlet opening arranged on an axial side of the first armature opposite the second armature;
a second sealing element corresponding to the second armature and selectively sealing an outlet opening configured to communicate the fluid, the outlet opening arranged on an axial side of the second armature opposite the first armature, the inlet opening and the outlet opening connected in a fluid-conducting fashion via a connecting duct;
wherein the first armature and the second armature respectively have a different closing time for closing the inlet opening and the outlet opening respectively, such that when an energization of the coil mechanism is at least one of interrupted and reduced the inlet opening is closable more quickly via the first armature than the outlet opening via the second armature; and
wherein an inlet opening cross-sectional area having an effective adjustment force with respect to the first armature is smaller than an outlet opening cross-sectional area having an adjustment force which is effective with respect to the second armature.

2. The double-armature solenoid valve as claimed in claim 1, wherein the at least one first restoring spring is structured and arranged such that the first spring force applied to the first armature when in the respective closed position is larger than the second spring force applied via the at least one second restoring spring to the second armature when in the respective closed position.

3. The double-armature solenoid valve as claimed in claim 1, wherein at least one of the at least one first restoring spring and the at least one second restoring spring is structured and arranged as a compression spring.

4. The double-armature solenoid valve as claimed in claim 3, wherein the at least one first restoring spring and the at least one second restoring spring are supported directly axially on the first armature and the second armature, respectively.

5. The double-armature solenoid valve as claimed in claim 4, wherein the at least one first restoring spring and the at least one second restoring spring are axially supported on a common abutment element arranged in a region between the first armature and the second armature.

6. The double-armature solenoid valve as claimed in claim 1, wherein at least one of:
the first armature and the second armature are configured geometrically different from one another;

one of the first armature and the second armature is composed of a material which conducts magnetic flux differently than a material of the other of the first armature and the second armature and which has a magnetic remanence which is different than the material of the other of the first armature and the second armature; and the first armature has a mass that is lower than a mass of the second armature.

7. The double-armature solenoid valve as claimed in claim 1, wherein the first armature and the second armature respectively have magnetic characteristics differing from one another such that an adjustment movement of the second armature is at least one of delayed and slowed down relative to an adjustment movement of the first armature.

8. The double-armature solenoid valve as claimed in claim 7, wherein at least one of:

a magnetic remanence in the second armature is greater than a magnetic remanence in the first armature such that the respective closing time of the first armature and the second armature is different; and a magnetic flux resistance in the first armature is greater than a magnetic flux resistance in the second armature such that the respective closing time of the first armature and the second armature is different.

9. The double-armature solenoid valve as claimed in claim 8, wherein an axial section of the first armature includes a radial constriction section providing the first armature with the magnetic flux resistance that is greater than the magnetic flux resistance in the second armature.

10. The double-armature solenoid valve as claimed in claim 1, wherein the first armature and the second armature are respectively structured and arranged to be magnetically attractive to one another when the coil mechanism is energized.

11. The double-armature solenoid valve as claimed in claim 1, wherein the first armature and the second armature are respectively tappet shaped and arranged radially within the coil mechanism in an armature space.

12. The double-armature solenoid valve as claimed in claim 1, wherein at least one of:

the at least one first restoring spring has, when the first armature is in the respective closed position, a first spring prestress which is greater than a second spring prestress of the at least one second restoring spring when the second armature is in the respective closed position; and the at least one first restoring spring has a greater spring constant than a spring constant of the at least one second restoring spring.

13. The double-armature solenoid valve as claimed in claim 1, wherein at least one of:

the first armature is configured as a core in a magnetic flux circuit of the second armature; and the second armature is configured as a core in a magnetic flux circuit of the first armature.

14. The double-armature solenoid valve as claimed in claim 1, wherein the communicating duct is defined by an armature space within the coil mechanism configured to accommodate the first armature and the second armature.

15. The double-armature solenoid valve as claimed in claim 1, wherein the coil mechanism is configured to apply a magnetic force to the second armature that is one of equal to and lower than a fluid pressure closing force exertable on the second armature by fluid within the connecting duct when there is a leak at the outlet opening.

16. The double-armature solenoid valve as claimed in claim 1, wherein the coil mechanism is configured as a single coil and is arranged at a periphery of both the first armature and the second armature.

17. A method for operating a double-armature solenoid valve as claimed in claim 1, comprising:

axially adjusting the first armature and the second armature toward one another along the adjustment axis via energizing the coil mechanism and providing the magnetic flux in both the first armature and the second armature;

opening the inlet opening and the outlet opening via axially adjusting the first armature and the second armature toward one another along the adjustment axis and into the respective open position;

producing a fluid flow through the inlet opening to the connecting duct, through the connecting duct to the outlet opening, and through the outlet opening via opening the inlet opening and the outlet opening;

closing the inlet opening and the outlet opening via at least one of reducing and interrupting the energization of the coil mechanism;

adjusting the first armature into the respective closed position in a direction of the inlet opening to close the inlet opening via the at least one first restoring spring;

adjusting the second armature into the respective closed position in a direction of the outlet opening to close the outlet opening via the at least one second restoring spring; and decreasing a fluid pressure in the connecting duct to be lower than a fluid pressure upstream of the inlet opening relative to a direction of the fluid flow;

wherein, after the at least one of interrupting and interrupting the energization of the coil mechanism, the second armature is adjusted into the respective closed position and closes the outlet opening later than the first armature is adjusted into the respective closed position and closes the inlet opening.

18. The method as claimed in claim 17, further comprising applying a closing force to the second armature in a direction of the respective closed position via a fluid flowing into the connecting duct when there is a leak in a region of the inlet opening.

19. The method as claimed in claim 17, further comprising reducing a magnetic flux density in the second armature more slowly after the at least one of interrupting and reducing of the energization of the coil mechanism than a magnetic flux density in the first armature.

20. A fuel system in a motor vehicle comprising a double-armature solenoid valve as claimed in claim 1, wherein the double-armature solenoid valve is actuatable such that water is dischargeable from the fuel system via the double-armature solenoid valve.

* * * * *